(12) United States Patent
Kubo

(10) Patent No.: US 6,380,715 B1
(45) Date of Patent: Apr. 30, 2002

(54) ELECTRIC POWER SYSTEM

(75) Inventor: Kenji Kubo, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/791,727

(22) Filed: Feb. 26, 2001

(30) Foreign Application Priority Data

Dec. 27, 2000 (JP) ........................................ 2000-397282

(51) Int. Cl.[7] ............................................. H01M 10/46
(52) U.S. Cl. ........................................ 320/128; 320/162
(58) Field of Search ................................. 320/104, 125, 320/127, 128, 135, 137, 162, 163, 164

(56) References Cited

U.S. PATENT DOCUMENTS 3,794,905 A * 2/1974 Long
5,712,795 A * 1/1998 Layman et al.
5,788,004 A * 8/1998 Friedmann et al.

FOREIGN PATENT DOCUMENTS

JP         09-182316       * 7/1997

* cited by examiner

*Primary Examiner*—Edward H. Tso
(74) *Attorney, Agent, or Firm*—Antonelli, Terry, Stout & Kraus, LLP

(57) ABSTRACT

An electric power system including a power source, a load, a battery discharging power to the load and accumulating power from the power source, a power detector detecting power supplied from the power source, a power converter converting power charged to and discharged from the battery, and a power controller controlling power converted by the power controller. When power supplied to the load from the power source exceeds an upper limit, the power converter is controlled by a current command calculated from deviation between the supplied power and the upper limit to discharge power to the load from the battery. When the power is below a charge threshold of the battery, the power converter is controlled by a charge command to supply a power to the battery from the power source.

14 Claims, 9 Drawing Sheets

INSTANTANEOUS POWER WAVEFORM

STRUCTURE OF BAND ELIMINATING FILTER

LOAD POWER WAVEFORM (14kW→21kW)

INSTANTANEOUS POWER WAVEFORM OF POWER SOURCE 1

OUTPUT CURRENT WAVEFORM FROM ELECTRIC POWER SYSTEM

LOAD POWER

OUTPUT POWER OF POWER SYSTEM

OUTPUT POWER OF POWER SOURCE 1

ELECTRIC POWER SYSTEM

BACKGROUND OF THE INVENTION

The present invention relates to an electric power system of an alternating current or a direct current, and in particular, to an electric power system which levels the magnitude of a load as viewed from a power source, when the magnitude of the load varies with time.

In a prior art system for leveling a load of a system in which the magnitude of the load with respect a power source varies, as described in JP-A-9-182316, a distributed electric power system is known in which a power converter linked to a power system is provided, and when the load is small at night or the like, the power is accumulated or stored in power accumulating or storing means through the power converter, and when the load is large as in a peak load time in the daytime, the power accumulated in the power accumulating means is discharged. Also, in case of power failure in the electric power system, the power stored in the power accumulating means is supplied to the load through the power converter, thereby to continue the operation of the load even at the time of power failure.

In such a distributed electric power system, the power supplied to the load is monitored, the magnitude of the power output to the power system in response to the magnitude of the load power is calculated, and the power is discharged in accordance with the calculated value from the power accumulating means. On the other hand, when the value of the load power during the monitor is small, the magnitude of residual power viewed from the power system is calculated in the same way, and the power is accumulated in accordance with its value.

SUMMARY OF THE INVENTION

In the system as mentioned above, the magnitude of the power at the load side is detected, monitored, and the power to be discharged or charged is determined depending on its value. As a result, when the power change is relatively slow, as in the case of leveling the change in the power in the daytime and at night, it is possible to control the discharged power sufficiently fast. However, when the magnitude of the load is changed frequently and rapidly depending on the use condition of the equipment, for example, as at the time of starting the load in household, such as a microwave oven or an electromagnetic cooking device or air-conditioner, if the discharging power is calculated after detecting the load power, the power matched with the change of the load can not be supplied accurately. Thus, it is necessary to supply the power to the load from the power system by the deviated amount of the discharged power.

Furthermore, the discharged power from the power accumulating means is output to the power system through the power converter. For this reason, the accuracy of the discharged power is degraded due to the influence of loss of the power converter. Here, the discharged power of the power accumulating means depends not only on the discharged current but also on the voltage of the power accumulating means. Generally, its voltage is reduced due to the discharge from the power accumulating means. These are the error factors of the discharged power control. In this manner, due to the control error of the power accumulating means or the power converter, a deviation occurs between the discharged power from the power accumulating means and the load power which is desired to level off, and the peak of the load power can not be suppressed sufficiently. Furthermore, when the discharged power from the power accumulating means has become larger than the load power, there is a problem of reverse flow of the discharged power into the power system.

By making the load power level off, there is no need to prepare a power source capacity of the power system matched with the peak load value, and it is possible to have the power source capacity matched with the leveled power. However, in such a conventional technique, because of the control lag and error of the discharged power, it is necessary that the power source side be able to supply a peak power corresponding to the amount of error, and it is impossible to reduce the power source capacity.

The object of the present invention is to provide an electric power system in which with respect to a load power which varies rapidly, power is discharged from the power accumulating means to suppress the power peak, and the power source capacity is reduced to a value matched with a leveled capacity.

In order to achieve the above-mentioned object, an electric power system according to one aspect of the present invention, comprises a power source, a load supplied with power from the power source, a battery for discharging power to the load and for accumulating or storing power from the power source, a power detector for detecting the power supplied from the power source, a power converter for power converting the power charged to and discharged from the battery, and a power controller for controlling the power which is power converted by the power converter, and wherein when a detection value of the power supplied to the load from the power source exceeds a predetermined power upper limit value, the power discharged to the load from the battery is controlled on the basis of a deviation between the detection value of the power and the power upper Limit value.

Furthermore, an electric power system according to another aspect of the present invention, comprises a power source, a load supplied with power from the power source, a battery for discharging power to the load and for accumulating power from the power source, a power detector for detecting the power supplied from the power source, a direct current power converter for controlling the charging and discharging of the battery, a further power converter for controlling the output voltage of the direct current power converter at constant irrespective of the charge and discharge of the battery, and a power controller for controlling the power charged and discharged by the battery, and wherein, when a detection value of the power supplied to the load from the power source exceeds a predetermined power upper limit value, the power discharged to the load from the battery is controlled on the basis of a deviation between the detection value of the power and the power upper limit value.

In one embodiment, when a detection value of the power supplied to the load from the power source is equal to or lower than a predetermined threshold value, charging power is supplied to the battery.

BRIEF DESCRIPTION OF THE DRAWINGS

The foregoing and other objects, features and advantages of the invention will be apparent from the following more particular description of the preferred embodiments of the invention as illustrated in the accompanying drawings whereon.

DESCRIPTION OF THE EMBODIMENTS

Figure 1:
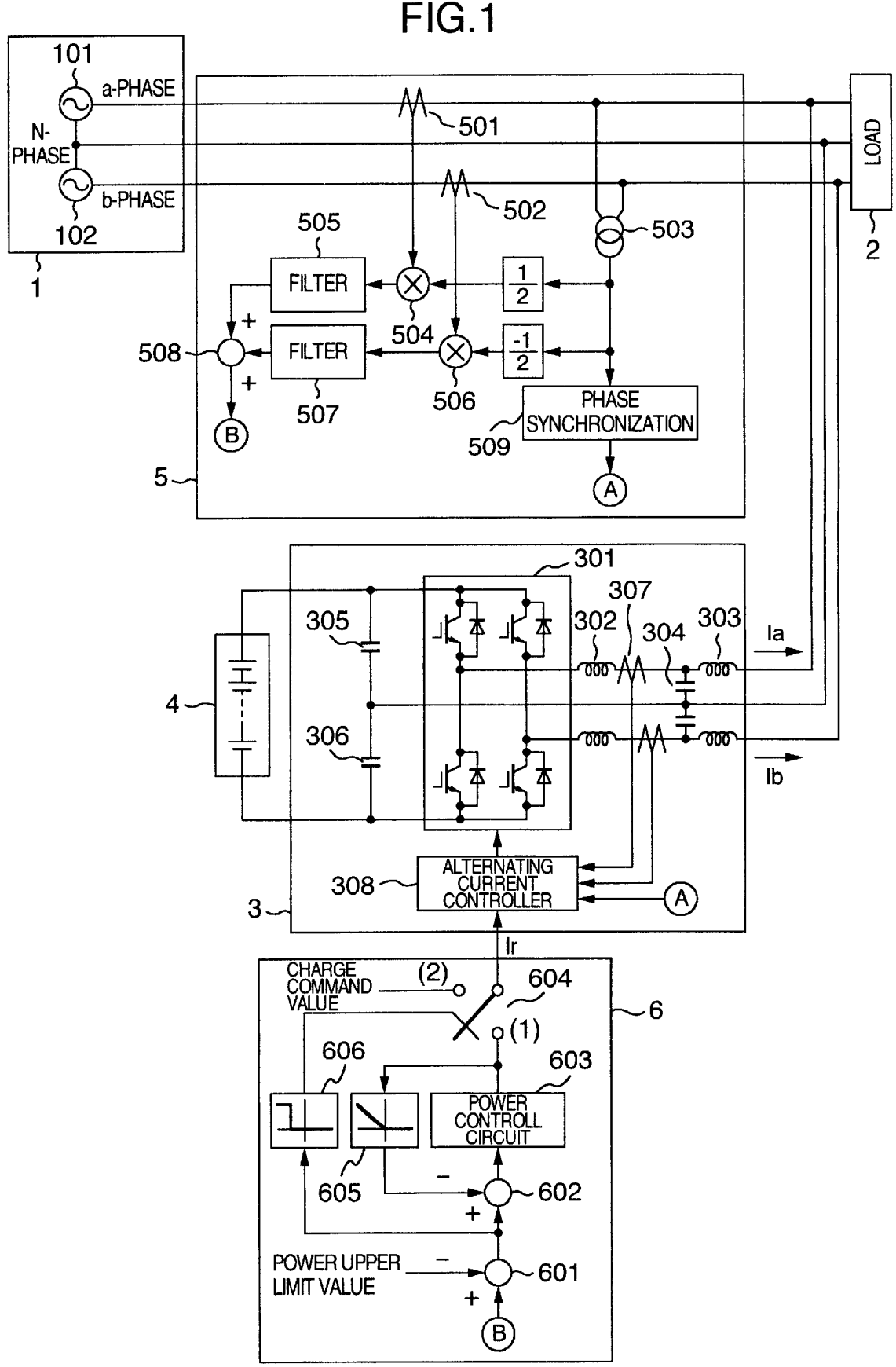
FIG. 1 is a diagram showing a structure of a first embodiment of an electric power system of the present invention.

Hereinafter, embodiments of the present invention will be described with reference to the drawings. Throughout the all drawings, similar members are attached with similar reference numerals.

FIG. 1 shows a first embodiment of an electric power system of the present invention. In FIG. 1, a single-phase three-line load 2 is connected to a single-phase three-line 200V power source 1. The electric power system is connected between the power source 1 and the load 2, and it comprises a power converter 3 for supplying the power to the load 2 and for accumulating or storing the power from the power source 1 into a battery 4, the battery 4 formed with a secondary battery, a power detector 5 for detecting the power of the power source 1, and a power controller 6 for controlling the power released to the load 2 from the power converter 3 or the power accumulated into the battery 4 from the power source 1. Here, the load 2 represents single-phase three-line 200V loads collectively which are connected to the power source 1, and theses loads include an illumination, a refrigerator, an air-conditioner, a microwave oven, an electromagnetic cooking device, or the like.

First, the power detector 5 includes an alternating current transformer 501 for detecting an a-phase current of the single-phase three-line 200V power source 1, an alternating current transformer 502 for detecting a b-phase current, a synchronous transformer 503 for detecting a line voltage between a-phase, multipliers 504 and 506 for multiplying a phase current detection value by a line voltage detection value, filters 505 and 507, an adder 508, and a phase synchronization 509 for calculating a phase signal synchronized with the voltage of the power source 1.

Figure 2A:
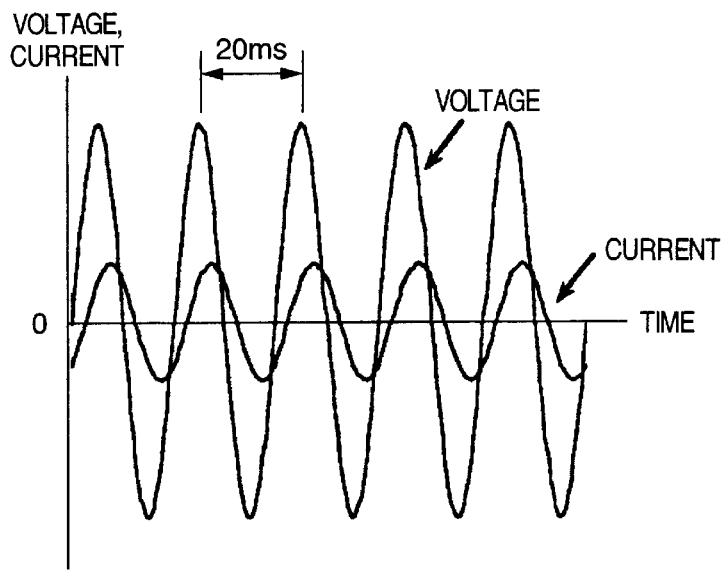
FIGS. 2A, 2B, and 2C are diagrams respectively showing a first, a second operation waveforms and a structure of a band eliminating filter, for explaining power detection of the present invention.
Figure 2B:
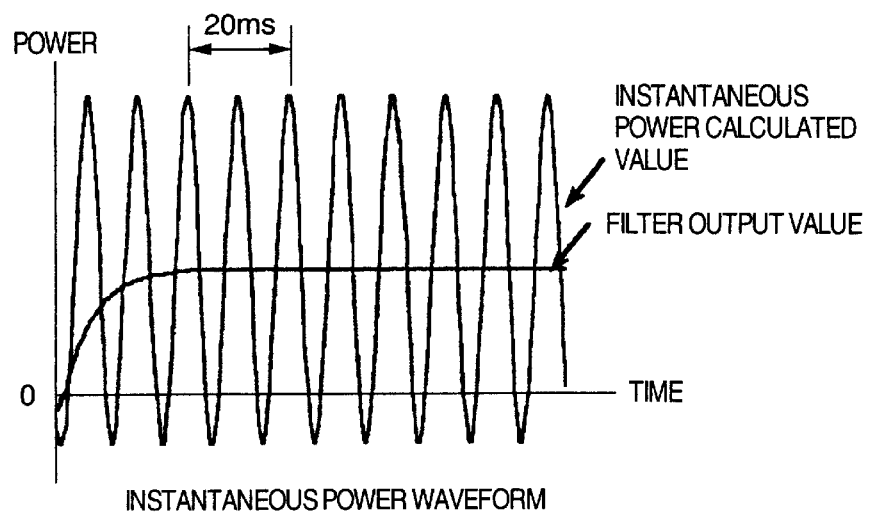

With the arrangement, the power supplied to the load 2 from the power source 1 is detected. The operation waveform at this time is shown in FIGS. 2A and 2B. Here, as a general load, a lag load having a power factor of 0.7 is assumed. First, an a-phase current detection value detected by the alternating current transformer 501 is multiplied by a line voltage detected by the synchronous transformer 503, which line voltage has been multiplied by a factor (½). By multiplying the a-phase current by this line voltage in the mutiplier 504, a-phase power is calculated. Also, a b-phase current detection value detected by the current transformer 502 is multiplied, in the mutiplier 506, by a line voltage detected by the synchronous transformer 503 and multiplied by a factor (−½). Thus, b-phase power is calculated. The sum of both powers is an instanteneous power of singe-phase 200V. As shown in FIG. 2B, an instanteneous value of the single-phase power altenates at two times the power source frequency.

Then, the instantaneous power detection value calculated by the product of the phase current and the line voltage is applied to the band elimination filters 505 and 507 having a natural frequency corresponding to two times the power source frequency, so as to remove alternating frequency components. As a result, the magnitude (filter output value) of the power supplied to the load 2 from the power source 1 can be detected.

Figure 2C:
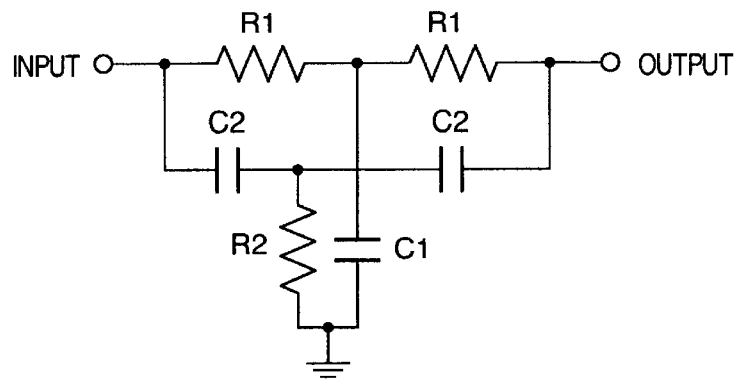

Here, a structure of the band elimination filter is shown in FIG. 2C. By designing the constants of capacitors and resistors, an analog filter for band eliminating the frequency components of two times the power source frequency can be formed. When expressing a transfer function of the filter in equation (1), the relationship between the capacitor values and the resistor values is expressed by equation (2).

$$\text{Transfer function} = (S^2 + \omega^2)/(S^2 + 2 \cdot \xi n \cdot \omega n + \omega^2) \tag{1}$$

$$\text{When } C1 = 2 \cdot C2,\ R1 = 2 \cdot R2,\ \omega n = 1/(2 \cdot C2 \cdot R2),\ \zeta n = 2 \tag{2}$$

Next, the power converter 3 is a voltage type inverter having a single-phase three-line output, and it uses IGBT (Insulated Gate Bipolar Transistor) as a switching element. This power converter 3 converts by a power converting circuit 301 the direct current power at the side of the smoothing capacitors 305 and 306 and the alternating current power at the side of the power system bidirectionaly. Its output is system linked to the power source 1 through reactors 302 and 303 and a capacitor 304. The battery 4 is connected to the smoothing capacitors 305 and 306, and the power of the battery 4 is discharged to the power system through the power converting circuit 301 or the power of the power system is charged into the battery 4 through the power converting circuit 301. The battery 4 includes a plurality of secondary batteries connected in multi-serially, and the whole voltage is changed depending on a charged state of each secondary battery. The whole voltage of the battery 4 is required to be larger than a crest value of the power system voltage, and the whole voltage of the battery 4 is set to satisfy the following relationship.

$$\text{battery volt} > \sqrt{2} \times 200V = 280V \tag{3}$$

The power converting circuit 301 is controlled by an alternating current controller 308 so that a phase current detected by a current detector 307 becomes a predetermined alternating current synchronized with the power system voltage.

Figure 3:
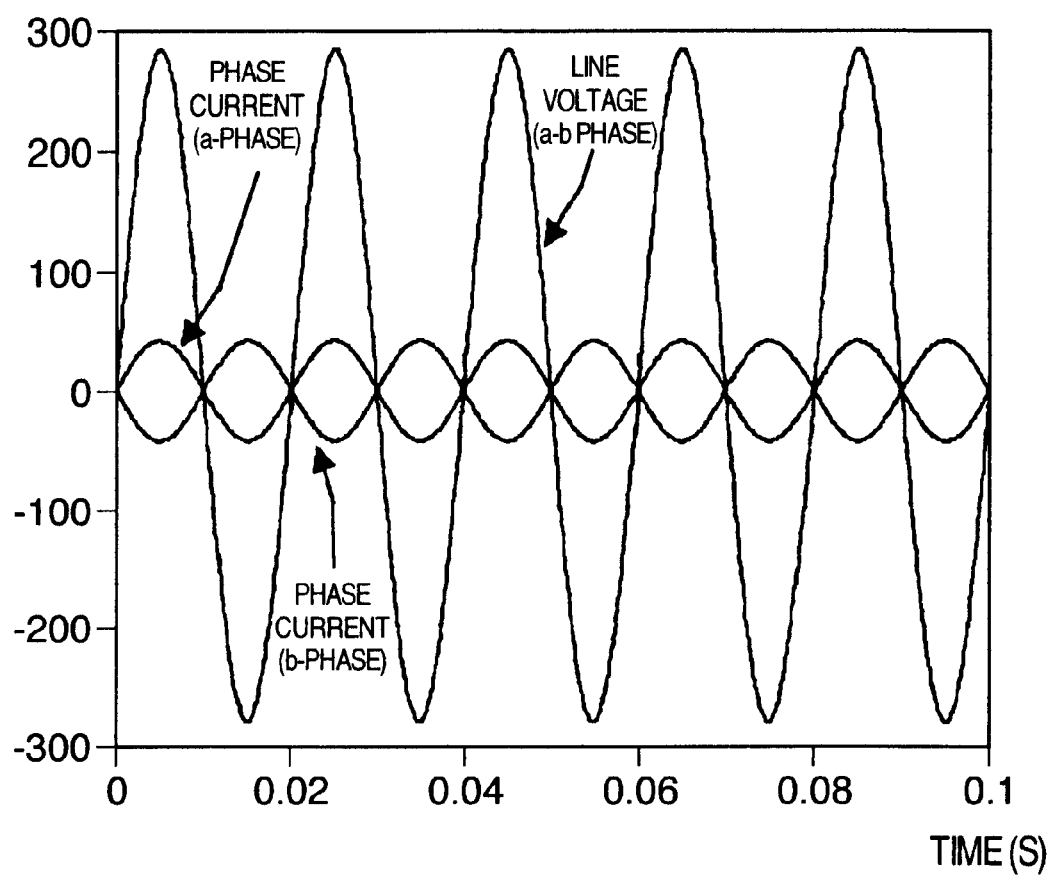
FIG. 3 is a waveform diagram for explaining the operation of a power converter of the present invention.

The operation waveform at this time is shown in FIG. 3. This waveform represents a condition in which with respect to the a-b phase line voltage of the single-phase three-line 200V, an alternating current having an effective value of 30 A is discharged at a power factor 1 with respect to the line voltage. In this waveform, the a-phase current and the b-phase current are 180 degree out of phase from each other. Also, in the case of charging the power of the power system into the battery 4, the phases of the line voltage and the alternating current are inverted with respect to the case of FIG. 3. Here, the alternating current controller 308 controls the gate signals of switching elements of the power converting circuit 301 so that irrespective of a change in the direct current voltage of the battery 4, the phase current of the power converting circuit 301 maintains the relationship in FIG. 3, and the magnitude of its phase current becomes a current command value Ir calculated by the power controller 6. For this purpose, the a-phase and b-phase current detection values by the current detector 307 and the voltage phase signal calculated by a phase synchronization 509 are fed back to the alternating current controller 308 to implement the control.

The power controller 6 calculates the current command value Ir supplied to the power converter 3 on the basis of a power detection value at the power source 1 side detected by the power detector 5. Here, in the case of discharging the power of the battery 4 to the power system, the current command value Ir is positive, and a change-over device 604 is connected to the (1) side. On the other hand, in the case of charging into the battery 4, the current command value Ir is negative, and the change-over device 604 is connected to the (2) side. Its change-over is implemented by a discriminator 606. First, a deviation between a power detection value and a power upper limit value is calculated by a subtracter 601. Here, the power upper limit value commands an upper limit of the power of the power source 1, and the discharged power from the power converter 3 is controlled so that the power of the power source 1 does not exceed the power upper limit value. The discriminator 606 connects the change-over device 604 to the (1) side when the deviation is larger than a predetermined negative value. When the deviation is smaller than the predetermined negative value. The change-over device 604 is connected to the (2) side.

A power control circuit 603 performs an integral control, and in the case where the power detection value of the power source 1 is larger than the power upper limit value, a deviation between the power detection value and the power upper limit value is integrated, and the current command value Ir to the alternating current controller 308 is calculated. The power converting circuit 301, in accordance with the current command value Ir, discharges the direct current power of the battery 4 to the power system as alterenating current power. Since this alterenating current power is supplied to the load 2, the voltage detection value of the power source 1 is decreased by the amount corresponding to the discharged power from the power converting circuit 301. In a condition wherein the amount of power of the load 2 exceeding the power upper limit and the discharged power from the power converting circuit 301 are coincide with each other, the deviation between the power detection value and the power upper limit becomes zero, and the current command value Ir becomes a constant value. On the other hand, in this condition, when the power of the load 2 decreases, the power detection value of the power source 1 becomes smaller than the power upper limit, and the deviation calculated in the subtracter 601 becomes negative. Since the power control circuit 603 performs the integral control, the current command value Ir decreases, and eventually becomes zero. According to this, the discharged power from the power converting circuit 301 also decreases, and eventually becomes zero. On the other hand, when the output of the power control circuit 603 becomes negative, in order to prevent the output of the power control circuit 603 from being reduced below negative, a non-linear gain 605 operates such that the output of the power control circuit 603 is subtracted by the subtracter 602. By virtue of this, even when the result of subtraction of the power upper limit from the power detection value is negative, the output of the power control circuit 603 never becomes negative. Furthermore, since the gain of the non-linear gain 605 becomes zero when the output of the power control circuit 603 is positive, the other operations are not affected.

Figure 4A:
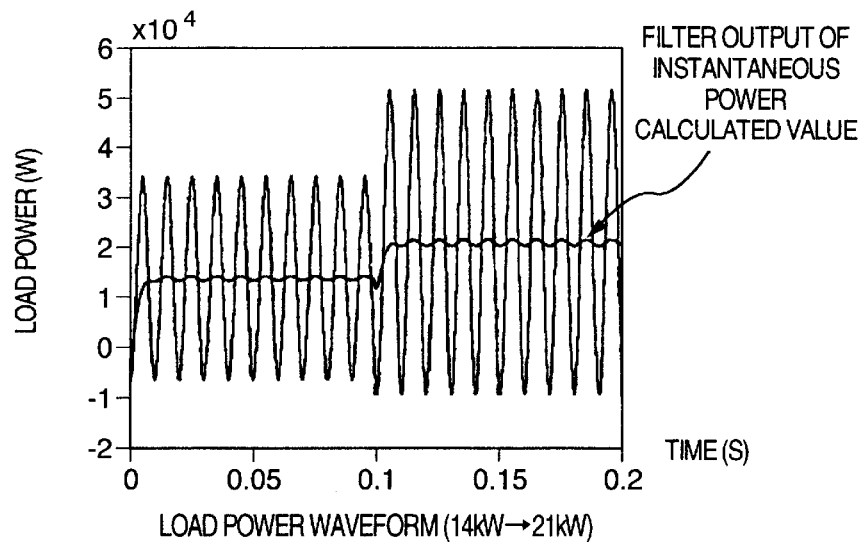
FIGS. 4A, 4B and 4C are respectively a load power waveform diagram, an instanteneous power waveform diagram of a power source 1, and an alternating current waveform diagram output from the electric power system, for explaining a peak cut operation of the present invention.
Figure 4B:
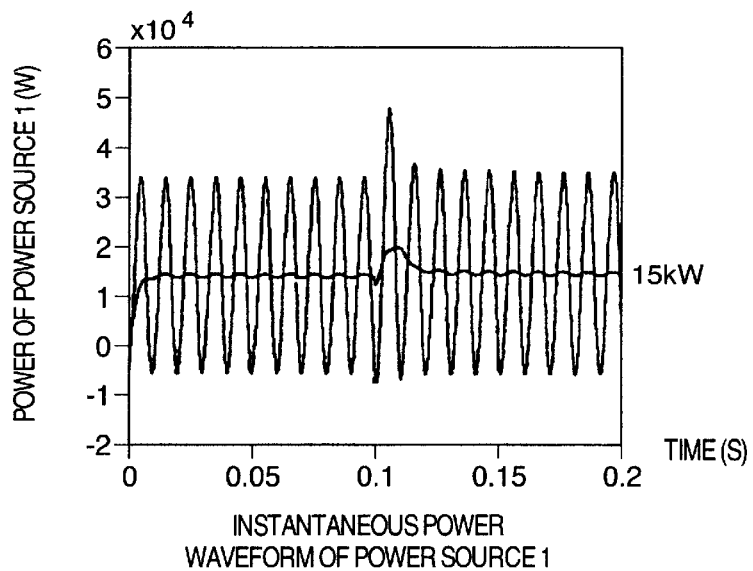
Figure 4C:
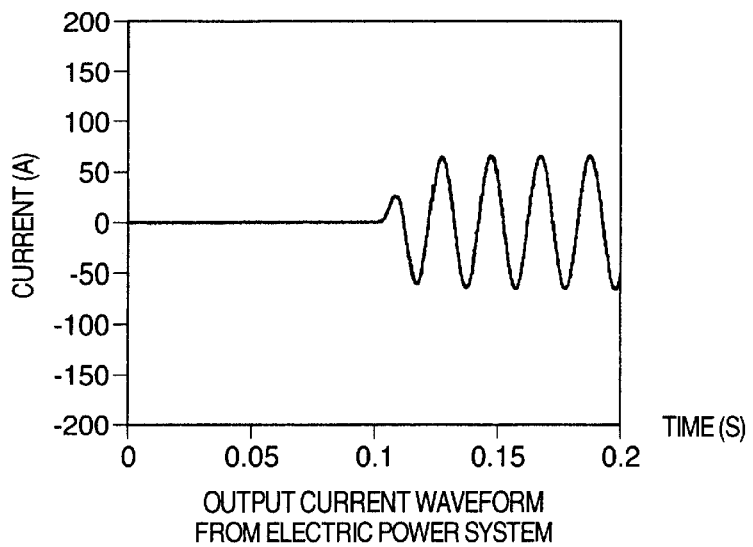

The operation waveforms at this time are shown in FIGS. 4A to 4C. FIG. 4A shows a load power waveform when the power of the load 2 increased to 21 kW from 14 kW at time 0.1 s. Here, in the case of single phase, the instanteneous power value alternates at two .times the commercial frequency. Here, a mean value of its instanteneous power is treated as the power detection value. In FIG. 4B, an instanteneous power waveform of the power source 1 is shown when the power upper limit value is set to 15 kW. Also, FIG. 4C shows an alternating current waveform which is output from the electric power system.

At the time point when the power supplied to the load 2 from the power source 1 exceeds the power upper limit value of 15 kW, the direct current power of the battery 4 is converted into the alternating current power by the power converting circuit 301, and discharged to the power system. The power control circuit 603 which performs the integral control makes the discharged power increase in response to the integral control. On the other hand, the power of the power source 1 side is relieved by the discharge from the electric power system, and at the time point when the power is reduced to 15 kW which is the set value of the power upper limit value, a value obtained by subtracting the power output from the electric power system from the power of the load matches with 15 kW which is the set value of the power upper limit value. Since the power control circuit 603 performs the integral control, at the time point when the power supplied to the load 2 from the power source 1 matches. with 15 kW which is the set value of the power upper limit value, the current command value Ir to the power converter 301 is held at a predetermined value.

Owing to such a closed loop control, irrespective of the battery voltage and power loss or the like of the power converter 3, the power of the power source 1 is controlled to always coincide with the set value of the power upper limit value.

On the other hand, when the power of the load 2 is reduced, and it becomes smaller than the power upper limit value, by the non-linear gain 605 responding to the polarity of the output of the power controller 603, the output of the power control circuit 603 is controlled so that it becomes zero. By virtue of this, it is possible to control the power of the power source 1 at the power upper limit value or lower, irrespective of the load condition of the load 2.

Furthermore, when the output power of the power source 1 becomes sufficiently small, and a value obtained by subtracting the power upper limit value from the power detection value of the power source 1 is equal to or lower than a predetermined negative value, the power of the power source 1 is used to charge the battery 4. The charging current is set to an arbitrary constant value depending on the characteristic of the battery 4. In other words, when the detection value of the power at the power source side is smaller than the power upper limit value by a predetermined value or larger, the discriminator 606 changes over the change-over device 604 to the charge side (2) from the discharge side (1). Here, a charge command value is a constant value independent of the power at the power source side, and the battery is charged with a constant current in a region in which the power of the power source side is small.

Here, in the discharge or charge of the battery 4, SOC (a state of charge) of the battery 4 is always monitored, and even during the discharge, when the SOC becomes a predetermined value or lower, the discharge from the battery 4 is stopped, and also, even during the charge, when the SOC becomes a predetermined value or higher, the charge is stopped.

Figure 5A:
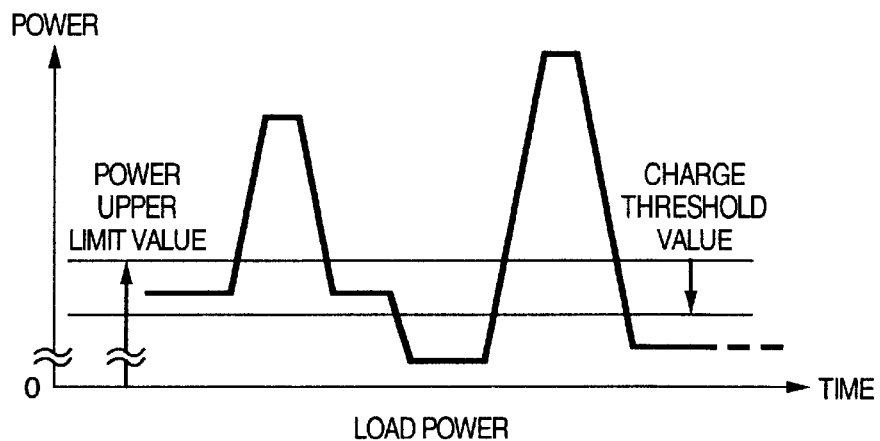
FIGS. 5A, 5B and SC respectively show a load power waveform, an output power waveform of a power system, and an output power waveform of a power source 1, for explaining the operation when a load is varied in the present invention.
Figure 5B:
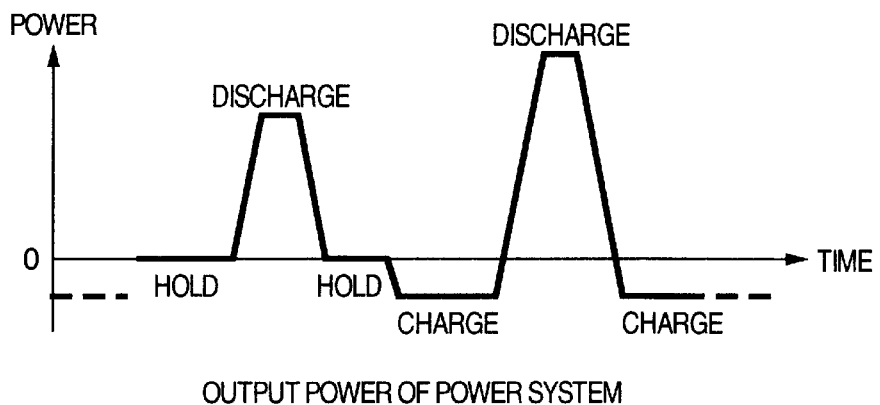
Figure 5C:
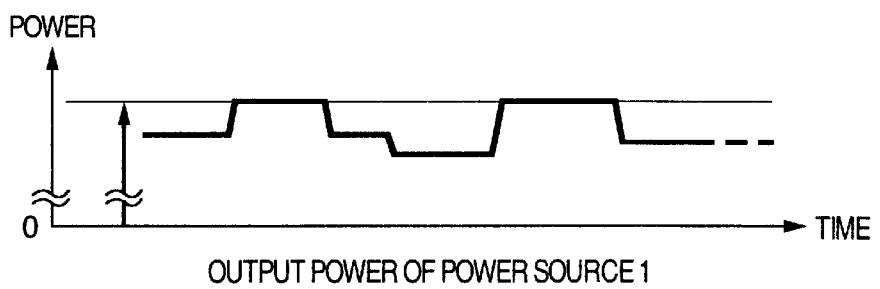

The behaviors of the output power from the electric power system and the output power of the power source 1, when the load power is varied are shown in FIGS. 5A to 5C. FIGS. 5A, 5B and 5C respectively show a load power waveform, an output power waveform of the power system, and an output power waveform of the power source 1. When the load power exceeds the power upper limit value, as shown in FIG. 5C, the output power of the power source 1 is controlled to reach the power upper limit value. As a result, as shown in FIG. 5B, from the electric power system, the power is output such that the load power exceeds the power upper limit value. On the other hand, when the load power is smaller than the power upper limit value, and also, the difference therebetween is larger than a charge threshold value, the electric power system charges the power of the power source 1 to the battery. In this manner, in the present embodiment, not only the output power of the power source 1 can be suppressed equal to or lower than the power upper limit value, but also the power of the power source 1 can be accumulated into the electric power system, when there is a margin in the output power of the power source 1.

As described above in detail, according to the present embodiment, since the discharged power from the battery 4 is suppressed by the feedback control so that the power of the power source 1 side does not exceed the power upper limit value which can be set arbitrary, the power of the power source 1 can be controlled with high response and high accuracy. Furthermore, since the discharge or charge of the battery can be controlled directly by the alternating current controller 308 for the power converting circuit 301, there is an advantage that the charge and discharge of the battery 4 can be implemented with high efficiency.

Figure 6:
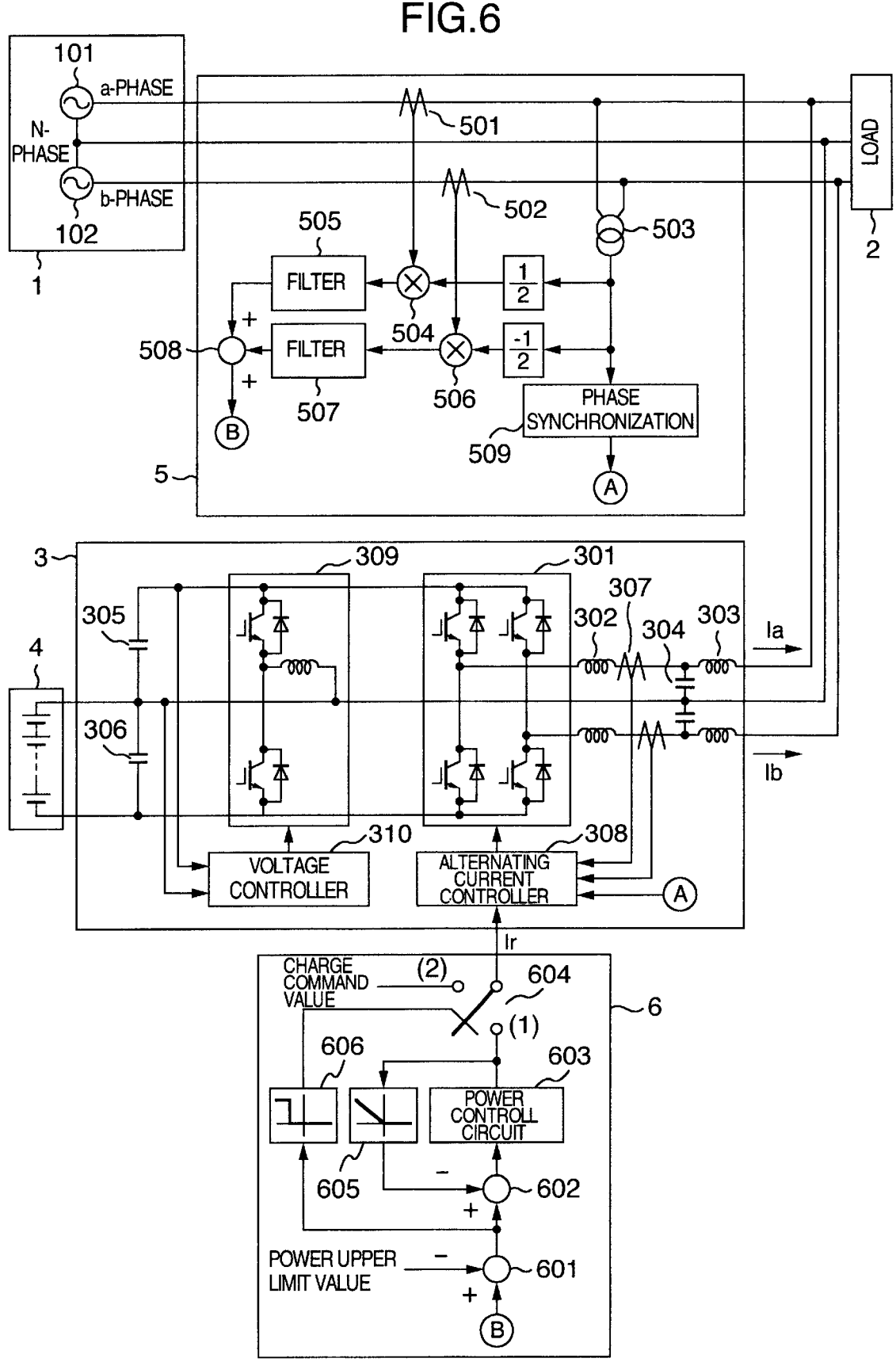
FIG. 6 is a diagram showing a structure of a second embodiment of the electric power system of the present invention.

FIG. 6 shows a second embodiment of the electric power system of the present invention. The difference from the first embodiment shown in FIG. 1 is that the battery 4 is connected at the smoothing capacitor 306 side of the power converter 3. Because of this, in order to balance the voltage unbalance between the smoothing capacitors 305 and 306 caused by the charge and discharge of the battery 4, a power converting circuit 309 is provided. Here, the power converting circuit 309 is formed by IGBTs and reactors, and it detects each voltage of the smoothing capacitors 305 and 306, and the current conduction rate in switching of each IGBT is controlled by a voltage controller 310, thereby to make the voltages of the smoothing capacitors 305 and 306 equal to each other. Here, since the battery 4 is connected at the smoothing capacitors 306 side, as compared with the first embodiment shown in FIG. 1, the whole voltage of the battery 4 can be made half. That is, the whole voltage of the battery 4 may satisfy the following relationship.

$$\text{battery voltage} > (\sqrt{2} \times 200V)/2 = 140V \quad (4)$$

As described above, according to the present embodiment, there is an advantage that the whole voltage of the battery 4 can be made small, and the number of the secondary batteries forming the battery 4 can be reduced.

Figure 7:
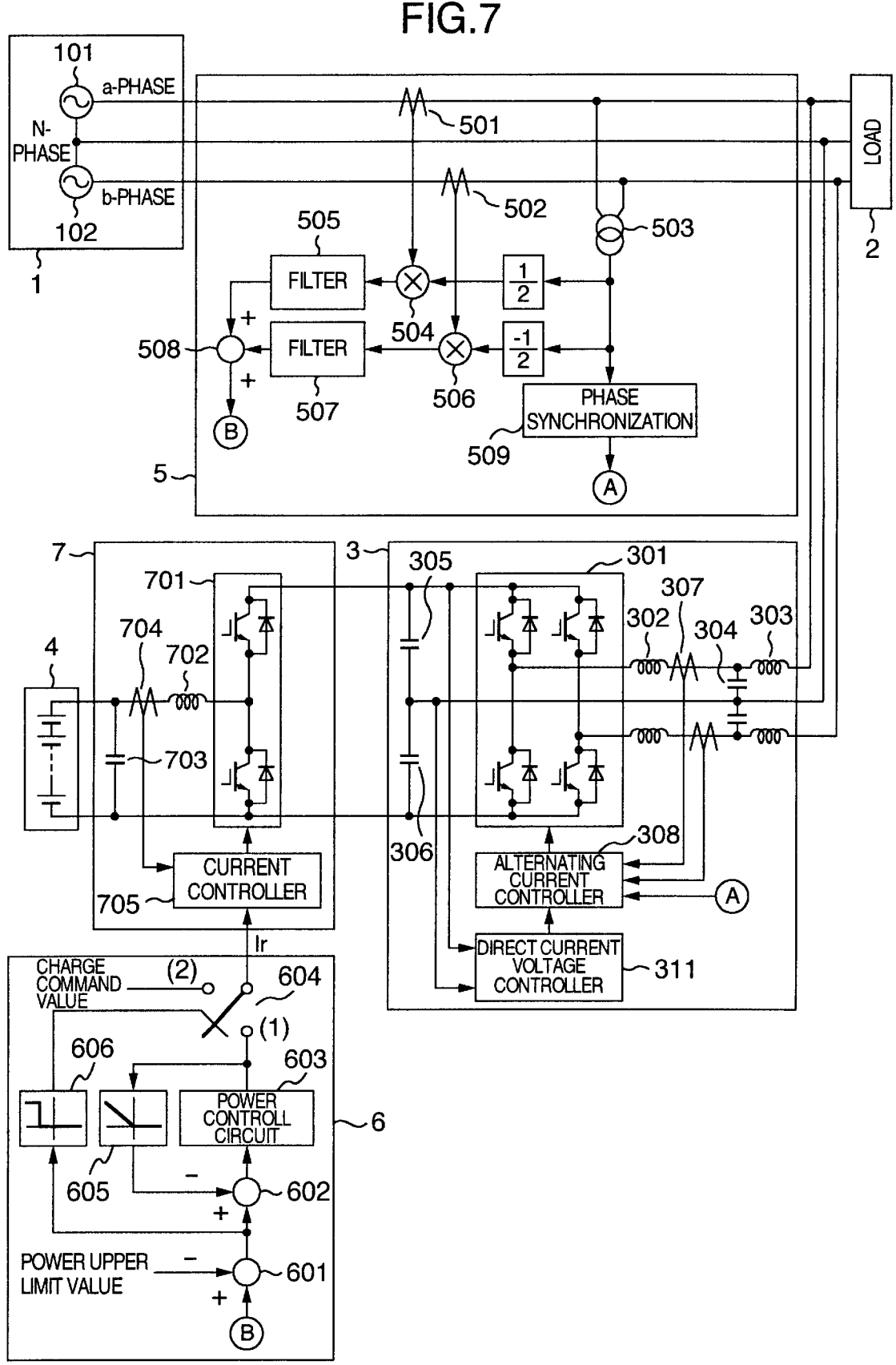
FIG. 7 is a diagram showing a structure of a third embodiment of the electric power system of the present invention.

FIG. 7 shows a third embodiment of the electric power system of the present invention. The difference from the first embodiment shown in FIG. 1 is that a direct current converter 7 is provided to control the charge and discharge of the battery 4. The direct current converter 7 is formed by a bidirectional chopper 701, a reactor 702, a smoothing capacitor 703, a current detector 704, and a current controller 705. In this respect, the power converter 3 has a similar structure as in the case of the first and second embodiments, and a direct current voltage controller 311 is added.

In FIG. 7, the power converter 3 is controlled so that the voltages of the smoothing capacitors 305 and 306 are equal each other, and these voltages are maintained at constant independent of the charge and discharge of the battery 4. For this purpose, the direct current voltage controller 311 detects the voltages of the smoothing capacitors 305 and 306, and when the voltages are larger than a predetermined set value, an alternating current voltage is discharged to the power system from the power converting circuit 301 by the alternating current controller 308. With this, the voltages of the smoothing capacitors 305 and 306 are controlled at a predetermined constant value. Furthermore, when the voltages of the smoothing capacitors 305 and 306 are smaller than a predetermined constant value, in a similar operation, the alternating current power is charged from the power system to control the voltages of the smoothing capacitors 305 and 306 at a predetermined constant value.

On the other hand, the current command value Ir calculated by the power controller 6 is supplied to the direct current power converter 7. The direct current power converter 7, in accordance with the current command value Ir, controls the discharge current from the battery 4 or the charge current to the battery 4. Here, the bidirectional chopper 701 is formed by IGBTs, and controls the discharge to the smoothing capacitors 305 and 306 from the battery 4, or the charge to the battery 4 from the smoothing capacitors 305 and 306, by controlling the current conduction rate of the switching. The current controller 705 controls the current conduction rate of the bidirectional chopper 701 so that the current detected by the current detector 704 coincides with the current command value Ir. Here, the reactor 702 and the smoothing capacitor 703 are provided for the purpose of smoothing a current ripple caused by the switching operation of the bidirectional chopper 701. The power discharged from the battery 4 makes the voltages of the smoothing capacitors 305 and 306 rise. Since the direct current controller 311 controls to maintain the voltages of the smoothing capacitors 305 and 306 at a predetermined constant value, the power discharged from the battery 4 is converted into the alternating current power by the power converting circuit 301, and discharged to the power system. On the other hand, when the battery 4 is charged, this operation lowers the voltages of the smoothing capacitors 305 and 306. As a result, the direct current controller 311 controls the power converting circuit 301 so that the alternating current power of the power system is charged to the side of the smoothing capacitors 305 and 306.

As described above, according to the present embodiment, since there is provided with the direct current power converter 7 which is dedicated to the charge and discharge of the battery 4, it is possible to set the voltages of the smoothing capacitors 305 and 306 at a constant value independent of the voltage of the battery 4. At this time, the whole voltage of the battery 4 is only required to satisfy the following relationship:

$$\text{battery voltage} < \text{added voltage of smoothing capacitors } 305, 306 \quad (5)$$

Therefore, even when the whole voltage of the battery 4 is small, there is an advantage that the direct current power of the battery 4 can be discharged to the power system, or the power of the power system can be charged into the battery 4. Furthermore, since the power converter 3 is only required to control the voltages of the smoothing capacitors 305 and 306 at constant, there is an advantage that the adjustment, and the maintenance of the control system are easy.

Figure 8:
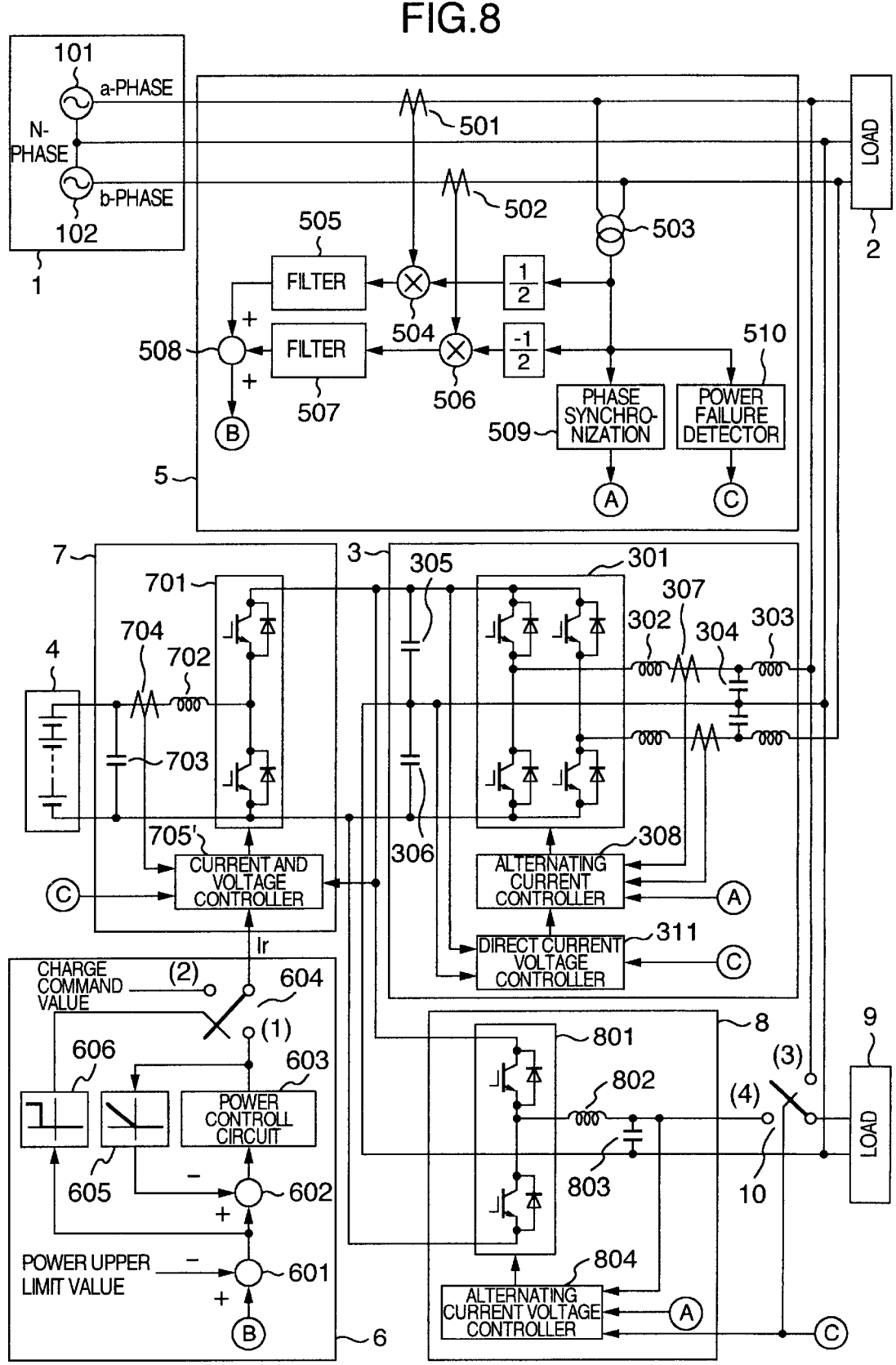
FIG. 8 is a diagram showing a structure of a fourth embodiment of the electric power system of the present invention.

Next, FIG. 8 shows a fourth embodiment of the electric power system of the present invention. The difference from the third embodiment shown in FIG. 7 is that an alternating current power output unit 8 is provided so that a load 9 added to the load 2 may be supplied with the alternating current power, and that the current controller 705 is made to have both functions of current control and voltage control as a current and voltage controller 705'. Here, the load 9 is a single-phase two-line 100V load, and when the power source 1 is normal, a relay 10 is connected to the (3) side, and the power is supplied to the load 9 from the power source 1. On the other hand, when the power source 1 is abnormal, the relay 10 is connected to the (4) side, and the power is supplied to the load 9 from the alternating current power output unit 8. Here, the voltage of the power source 1 is detected by a synchronous transformer 503, and the normal/abnormal of the power source 1 is discriminated from the detected voltage by a power failure detector 510. This discrimination is implemented based on the magnitude of the voltage or the frequency, etc. Furthermore, the alternating current power output unit 8 is formed by a power converting circuit 801, a reactor 802, a capacitor 803, and an alternating current voltage controller 804, and the power converting circuit 801 converts the voltages of the smoothing capacitors 305 and 306 into an alternating current voltage by the switching control of IGBTs. The reactor 802 and the capacitor 803 make the switching voltage of IGBTs smooth. The alternating current voltage controller 804 detects a voltage of the capacitor 803, that is, an alternating current output voltage of the alternating current power output unit 8, and controls the switching of the power converting circuit 801 so that the detected voltage value becomes a predetermined alternating current voltage.

When a voltage fall of the power source 1 is detected by the power failure detector 510, the alternating current power output unit 8 is operated, and the relay is changed over from (3) to (4), after waiting for the establishment of the alternating current voltage. At this time, the power converter 3, and the direct current power converter 7 continue the operation similar to that when the power source 1 is normal. In contrast, when the voltage of the power source 1 further falls, and the power converter 3 becomes unable to continue the operation, the operation of the power converter 3 is stopped, and on the other hand, the operation of the alternating current power output unit 8 is continued. Furthermore, the operation of the alternating current voltage controller 705' is changed over to the voltage control from the current control, and the output voltage of the bidirectional chopper 701 is detected, and the voltages of the smoothing capacitors 305 and 306 are controlled so that they become constant. By virtue of this, even in case of the power failure of the power source 1, the direct current power of the battery 4 is converted into the alternating current voltage by the alternating current power output unit 8, and supplied to the load 9. Therefore, the load 9 can be supplied with the single-phase two-line 100V without instantaneous interruption even in case of the fall of the voltage of the power source 1, or in case of the power failure of the power source 1. Here, the change-over of these series of operation modes is implemented by the power failure detector 510.

As described above in detail, according to the present embodiment, there is an advantage that not only the power of the power source 1 is controlled without exceeding the power upper limit value, but also a stable alternating current voltage can be supplied without instantaneous interruption to the specific load 9, even in case of the fall of the voltage of the power source 1, or in case of the power failure of the power source 1. Here, when the power source 1 is normal, since the alternating current power output unit 8 stops its operation, and the power of the power source 1 is supplied to the load 9 by the relay 10, there is an advantage that the switching loss due to the operation of the power converting circuit 801 does not occur.

Here in the present embodiment, it is described as to the relay 10 that, in case of normal of the power source 1, it is connected to the (3) side, and on the other hand, in case of the power failure of the power source 1, it is connected to the (4) side, and in case of normal of the power source 1, the alternating current power output unit 8 stops its operation. However, in another case of the present embodiment, the relay 10 is connected always to the (4) side, irrespective of normal or power failure (abnormal) of the power source 1, and the alternating current power output unit 8 is always operated. This case of the present embodiment will be described in detail.

In this case, when the power source 1 is normal, the power from the power source 1 is supplied to the power converter 3, and the output power thereof is supplied to the specific load through the alternating current power output unit 8, and on the other hand, when the power source 1 is in power failure (abnormal), the direct current power of the battery 4 is supplied to the specific load 9 through the alternating current power output unit 8.

In this case, there is an advantage that independent of the presence or absence of the power failure of the power source 1, the stable power can be supplied to the specific load 9 from the alternating current power output unit 8.

Figure 9:
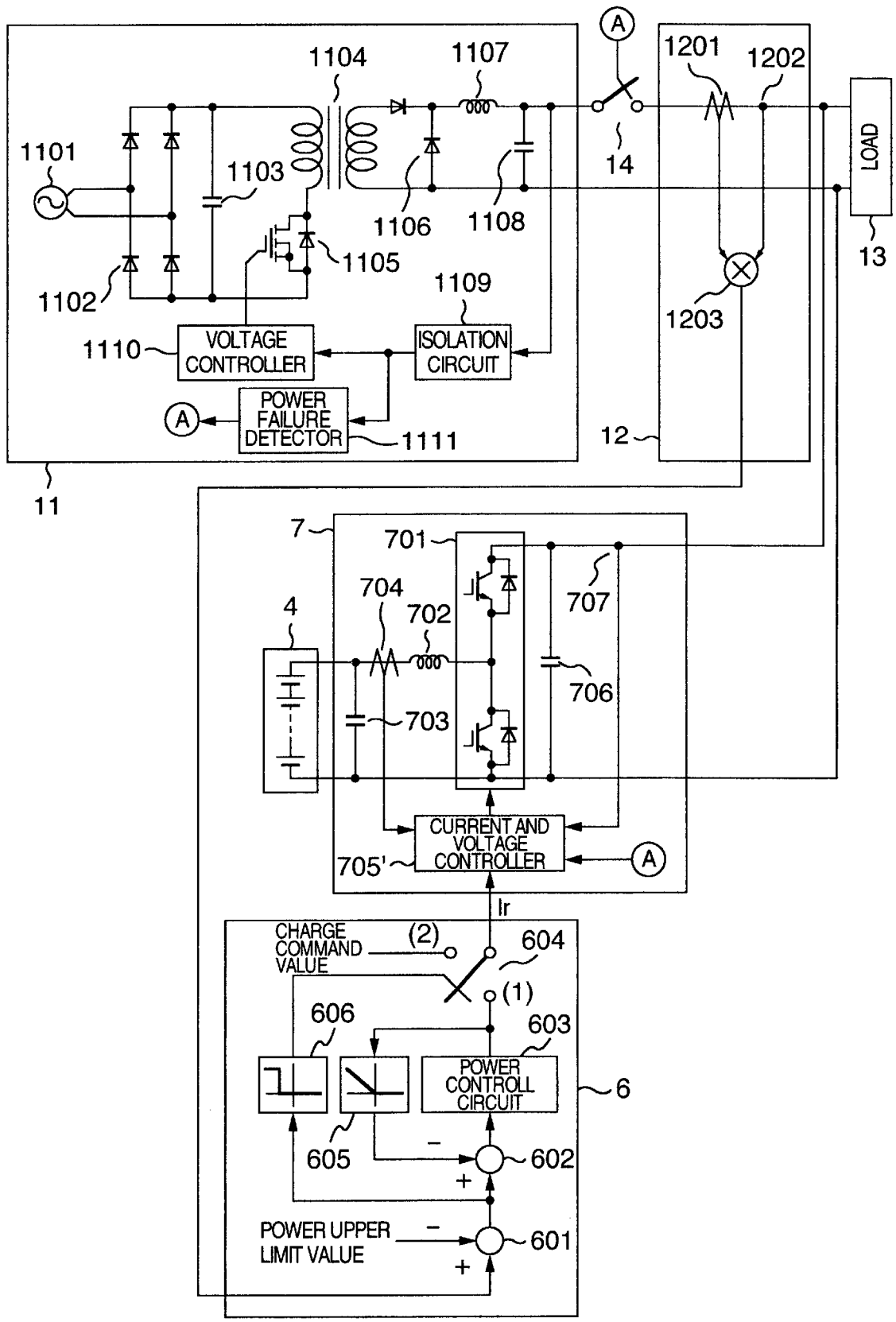
FIG. 9 is a diagram showing a structure of a fifth embodiment of the electric power system of the present invention.

FIG. 9 shows a fifth embodiment of the electric power system of the present invention. In FIG. 9, a direct current load 13 is connected to a direct current power source 11. The direct current power source 11 provides a voltage of 48V, and at the load 13, this 48V is converted into 12V, 5V and the like, and these voltages are used as power sources of a hard disk and a microcomputer, etc. For the direct current power source 11, a single-phase 100V power source 1101 is rectified by a diode bridge 1102, and converted into a direct current voltage of DC 140V by a smoothing capacitor 1103. This voltage is chopper controlled by a power MOSFET (Metal Oxide Gate Semiconductor Field Effect Transistor), and its voltage is lowered by a high frequency transformer 1104, and a direct current voltage of 48V is output by a diode 1106, a reactor 1107 and a smoothing capacitor 1108. Here, the output voltage is detected through an isolation circuit 1109, and the switching current conduction rate of a power MOSFET is controlled by a voltage controller 1110 so that the output voltage becomes constant.

The electric power system is connected between the direct current power source 11 and the direct current load 13. The electric power system is formed by a power detector 12 for calculating the output power at the power source side, a power converter 7, a battery 4, and a power controller 6. The power at the power source side is calculated by multiplying a detection value of the current by a detection value of the voltage at the power source side by a multiplier 1203. A deviation between the power calculated value and the power upper limit value is calculated by a subtracter 601, and when its value is positive, a current command value Ir for the battery 4 is calculated by a power control circuit 603. A current and voltage controller 705' operates as a current controller, and performs chopper control of a power converting circuit 701, so that the discharge current of the battery 4 is output in conformity with the current command value Ir. The power output from the power converting circuit 701 is supplied to the load 13. As a result, even in case of the same load power, the power output to the load 13 from the direct current power source 11 is reduced. Here, the power control circuit 603 performs the integral control. Thus, the discharge current command value is increased until the power of the power source side coincides with the power upper limit value, and the balance is reached in this condition. In this manner, by detecting and monitoring the power source side power, it is possible to level the power peak of the load 13.

On the other hand, when the power at the direct current power source side decreases and becomes lower than the power upper limit value, the output of the power control circuit 603, that is, the current command value Ir is reduced, and reaches a negative value. Here, at the time point when the output of the power control circuit 603 becomes negative, by a non-linear feedback 605, the current command value to the power converting circuit 701 becomes zero. As a result, the discharge from the battery 4 enters a hold or suspended state.

Furthermore, when the power at the power source side becomes sufficiently smaller than the power upper limit value, a change-over device 604 is changed over from the discharge side (1) to the charge side (2). As a result, the power converting circuit 701 chopper controls the power at the power source side, and charges the battery 4 to the charge command value.

Furthermore, when the output voltage of the direct current power source 11 falls due to power failure of the single-phase 100V power source 1101, the power failure is detected by a power failure detector 1111 based on the output voltage detected through the isolation circuit 1109. After the detection of the power failure, the current and voltage controller 705' is changed over from the current controller to the voltage controller, and the output voltage of the power converter 7 is detected by a voltage detector 707, and the voltage of the smoothing capacitor 706 is controlled to become constant. On the other hand, the change-over device 14 is turned off by the output of the power failure detector 1111, and the output of the direct current power source 11 is interrupted. By this, the power of the battery 4 is supplied to the load 13 through the smoothing capacitor 706. In this manner, even when the direct current power source 11 is brought down, the load 13 is backup operated by the electric power system, and owing to the function, it is possible to supply the power with no-power failure to a server and a data terminal, and a personal computer forming the load 13.

As described above, according the present embodiment, even in the case of the direct current power source, similar to the case of the alternating current power source described in the first embodiment, the peak of the load 13 can be supplemented by the electric power system, and the power source capacity of the direct current power source 11 can be reduced lower than the peak value of the load. Also, since the rapid power variations of the load 13 can be compensated by the electric power system, even when the voltage control characteristic of the direct current power source 11 is not satisfactory, the direct current power can be supplied stably. Also, in case of power failure of the direct current power source 11, there is an advantage that the electric power system is operated as a no-power failure direct current power source, and the power supply to the load 13 can be continued.

In each embodiment of the present invention described above, the power of the power source 1 is monitored, and by calculating a power mean value for each short time and a power mean value for each long time, a change with time of the power of the power source 1 after peak cutting by the mean value for each short time, and a mean value of the power after peak cutting by the mean value for each long time are respectively determined. The difference between both values represents the degree of leveling of the power after the peak cutting, and by adjusting the power upper limit value used in the peak cut control so that the difference between the both becomes small, it is possible to optimize the set value of the power upper limit value. Here, the period for calculating the mean value for each short time may be set to be 0.1 sec to 1.0 sec, and the period for calculating the mean value for each long time may be set to be about 10 min to 1 hour.

Also, in each embodiment of the present invention, the capacity of the electric power system used for peak cut control of the power source 1 is preferably several kW or lower, but not limited to this, and in particular, characterized by about 1 to 10 kW. Such a power source capacity is suitable for the peak cut control of the power source of about several k to several tens kW power source, and it is suitable for applying to a household or business power source system.

As described in the foregoing, according to the above embodiments, even when the magnitude of the load with respect to the power source is changed to a great extent, the discharged power from the battery is controlled by feedback control so that the power output from the power source side does not exceed the power upper limit value, and thus, it is possible to control the power of the power source with high response and high accuracy, and the power peak of the load can be leveled. Also, when the load is small, since the power of the power source can be accumulated or stored in the battery, it is possible to utilize the power capacity of the power source effectively at the maximum. As a result, it is possible to reduce the power source capacity to a value matched with the leveled capacity.

Furthermore, by providing the power converting circuit for balancing the voltage unbalance of the two smoothing capacitors due to the charge and discharge of the battery, it is possible to reduce the whole voltage of the battery, and decrease the number of the secondary batteries consituting the battery.

Furthermore, since the direct current power converter dedicated to charge and discharge the battery is provided, even when the whole voltage of the battery is small, it is possible to discharge the direct current power of the battery to the power system or to charge the power of the power system into the battery. Moreover, since the control of the power converter is only required to make the voltage of the smoothing capacitor constant independent of the charging or discharging condition of the battery, the adjustment of the control system, and the maintenance can be performed easily.

Moreover, when the voltage of the power source is lowered and when the power failure occured in the power source, it is possible to continue the supply of power to the load or specific load stably with no-power failure.

What is claimed is:
1. An electric power system comprising:
   a power source;
   a load supplied with power from said power source;
   a battery for discharging the power to said load, and for accumulating the power from said power source;

a power detector for detecting the supply power of said power source;

a power converter for power converting the power charged to and discharged from said battery; and a power controller for controlling the power which is power converted by said power converter, wherein, when a detection value of the power supplied to said load from said power source exceeds a predetermined power upper limit value, the power discharged to said load from said battery is controlled on the basis of a deviation between the detection value of said power and said power upper limit value.

2. An electric power system according to claim 1, wherein, when the detection value of the power supplied to said load from said power source is equal to or lower than a predetermined threshold value, the charge power is supplied to said battery from said power source.

3. An electric power system according to claim 1, wherein, said power converter includes two smoothing capacitors with one of said two smoothing capacitors being connected to said battery, and said power converter further includes a power converting circuit for detecting a voltage of each of said two smoothing capacitors, and for balancing a voltage unbalance of said two smoothing capacitors caused by the charge and discharge of said battery.

4. An electric power system according to claim 2, wherein, said power converter includes two smoothing capacitors with one of said two smoothing capacitors being connected to said battery, and said power converter further includes a power converting circuit for detecting a voltage of each of said two smoothing capacitors, and for balancing a voltage unbalance of said two smoothing capacitors caused by the charge and discharge of said battery.

5. An electric power system according to claim 1, wherein, a power failure detector of said power source is provided, and when a power failure occurs in said power source, the power is supplied to said load from said battery.

6. An electric power system according to claim 2, wherein, a power failure detector of said power source is provided, and when a power failure occurs in said power source, the power is supplied to said load from said battery.

7. An electric power system comprising:

a power source;

a load supplied with power from said power source;

a battery for discharging the power to said load, and for accumulating the power from said power source;

a power detector for detecting the supply power of said power source;

a direct current power converter for controlling the charge and discharge of said battery;

a further power converter for controlling the output voltage of said direct current power converter at constant independently of the charge and discharge of said battery; and a power controller for controlling the power which is charged to and discharged from said battery, wherein, when a detection value of the power supplied to said load from said power source exceeds a predetermined power upper limit value, the power discharged to said load from said battery is controlled on the basis of a deviation between the detection value of said power and said power upper limit value.

8. An electric power system according to claim 7, wherein, when the detection value of the power supplied to said load from said power source is equal to or lower than a predetermined threshold value, the power is charged to said battery from said further power converter through said direct current power converter.

9. An electric power system according to claim 7, wherein, a specific load is connected through a change-over device in parallel with said load connected to said power source, and an alternating current output unit is connected between said specific load and said direct current power converter, and a power failure detector of said power source is provided, and wherein, when a power failure occurs in said power source, said change-over device is changed over to said alternating current output unit, and the direct current power of said battery is converted into an alternating current voltage through said alternating current output unit, and is supplied to said specific load.

10. An electric power system according to claim 8, wherein, a specific load is connected through a change-over device in parallel with said load connected to said power source, and an alternating current output unit is connected between said specific load and said direct current power converter, and a power failure detector of said power source is provided, and wherein, when a power failure occurs in said power source, said change-over device is changed over to said alternating current output unit, and the direct current power of said battery is converted into an alternating current voltage through said alternating current output unit, and is supplied to said specific load.

11. An electric power system according to claim 7, further comprising: a specific load; an alternating current output unit connected between said specific load and a connection point between said direct current power converter and said further power converter; and a power failure detector of said power source, and wherein, when said power source is normal, the output voltage of said further power converter is converted into an alternating current voltage, and on the other hand, when the power failure occurs in said power source, the direct current power of said battery is converted into the alternating current voltage, and the power is supplied to said specific load.

12. An electric power system according to claim 8, further comprising: a specific load; an alternating current output unit connected between said specific load and a connection point between said direct current power converter and said further power converter; and a power failure detector of said power source, and wherein, when said power source is normal, the output voltage of said further power converter is converted into an alternating current voltage, and on the other hand, when the power failure occurs in said power source, the direct current power of said battery is converted into the alternating current voltage, and the power is supplied to said specific load.

13. An electric power system according to claim 1, wherein, said power upper limit value is set by obtaining a mean value in each short time of the power of said power source and a mean value in each long time, and by adjusting so that a difference between both the mean values becomes small.

14. An electric power system according to claim 7, wherein, said power upper limit value is set by obtaining a mean value in each short time of the power of said power source and a mean value in each long time, and by adjusting so that a difference between both the mean values becomes small.

* * * * *